United States Patent
Kim et al.

(10) Patent No.: US 12,418,071 B2
(45) Date of Patent: Sep. 16, 2025

(54) BATTERY RACK HAVING FIXING FRAME AND ENERGY STORAGE SYSTEM

(71) Applicant: LG ENERGY SOLUTION, LTD., Seoul (KR)

(72) Inventors: Dong-Hyun Kim, Daejeon (KR); Kyung-Min Lee, Daejeon (KR); Seung-Jun Lee, Daejeon (KR); Kown Son, Daejeon (KR); Goan-Su Jung, Daejeon (KR); Hee-Chan Kim, Daejeon (KR); Jong-Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 744 days.

(21) Appl. No.: 17/638,726

(22) PCT Filed: Jul. 27, 2020

(86) PCT No.: PCT/KR2020/095096
§ 371 (c)(1),
(2) Date: Feb. 25, 2022

(87) PCT Pub. No.: WO2021/040503
PCT Pub. Date: Mar. 4, 2021

(65) Prior Publication Data
US 2022/0285779 A1    Sep. 8, 2022

(30) Foreign Application Priority Data

Aug. 27, 2019 (KR) .................. 10-2019-0105127
Jul. 21, 2020 (KR) .................. 10-2020-0090588

(51) Int. Cl.
*H01M 50/262* (2021.01)
*H01M 50/211* (2021.01)

(52) U.S. Cl.
CPC ....... *H01M 50/262* (2021.01); *H01M 50/211* (2021.01)

(58) Field of Classification Search
None
See application file for complete search history.

(56) References Cited

U.S. PATENT DOCUMENTS 668,109 A * 2/1901 Mailloux
2002/0086202 A1  7/2002 Stone et al.
(Continued)

FOREIGN PATENT DOCUMENTS

CN    109643872 A    1/2019
JP    2013-120695 A    6/2013
(Continued)

OTHER PUBLICATIONS

International Search Report for PCT/KR2020/095096 (PCT/ISA/210) mailed on Oct. 28, 2020.
(Continued)

*Primary Examiner* — Anca Eoff
(74) *Attorney, Agent, or Firm* — Birch, Stewart, Kolasch & Birch, LLP

(57) ABSTRACT

A battery rack with increased durability to prevent a rack case from being deformed or broken by external impacts during delivery. To achieve the above-described object, the battery rack includes a plurality of battery modules arranged in a first direction, at least one rack case including a plurality of rack frames configured to mount the plurality of battery modules, and at least one fixing frame including a body in the shape of a plate extending along the plurality of battery modules and a fixing portion formed on one surface of the body and configured to be attached and detached to/from each of the plurality of battery modules.

18 Claims, 16 Drawing Sheets

(56) References Cited

U.S. PATENT DOCUMENTS

| | | |
|---|---|---|
| 2006/0028171 A1 | 2/2006 | Marraffa |
| 2007/0264562 A1* | 11/2007 | Kang .................. H01M 50/262 |
| | | 429/96 |
| 2012/0263989 A1 | 10/2012 | Byun et al. |
| 2014/0017528 A1 | 1/2014 | Uehara et al. |
| 2014/0134460 A1 | 5/2014 | Youn |
| 2014/0342213 A1 | 11/2014 | Ebisawa et al. |
| 2015/0333303 A1 | 11/2015 | Hachiya et al. |
| 2017/0133641 A1 | 5/2017 | Lee |
| 2017/0331166 A1 | 11/2017 | Hasegawa |
| 2019/0140229 A1 | 5/2019 | Lindstrom et al. |
| 2019/0190203 A1 | 6/2019 | Sawada |

FOREIGN PATENT DOCUMENTS

| | | |
|---|---|---|
| JP | 2013-243043 A | 12/2013 |
| JP | 2017-61820 A | 3/2017 |
| JP | 2018-173202 A | 11/2018 |
| JP | 2019-52416 A | 4/2019 |
| JP | 2019-516229 A | 6/2019 |
| KR | 10-2007-0041023 A | 4/2007 |
| KR | 10-2012-0117413 A | 10/2012 |
| KR | 10-2014-0061212 A | 5/2014 |
| KR | 10-1466590 B1 | 11/2014 |
| KR | 10-2016-0094216 A | 8/2016 |
| KR | 10-2016-0142610 A | 12/2016 |
| KR | 10-2017-0054100 A | 5/2017 |
| KR | 20-2017-0003300 U | 9/2017 |
| KR | 10-1799537 B1 | 11/2017 |
| KR | 10-1826933 B1 | 2/2018 |
| KR | 10-2018-0041071 A | 4/2018 |
| KR | 10-1905374 B1 | 10/2018 |
| KR | 10-1965980 B1 | 4/2019 |
| KR | 10-1978321 B1 | 5/2019 |
| WO | WO 2012/132134 A1 | 10/2012 |
| WO | WO 2013/103073 A1 | 7/2013 |
| WO | WO 2014/073544 A1 | 5/2014 |

OTHER PUBLICATIONS

Extended European Search Report for corresponding European Application No. 20857113.3, dated May 31, 2023.

* cited by examiner

BATTERY RACK HAVING FIXING FRAME AND ENERGY STORAGE SYSTEM

TECHNICAL FIELD

The present disclosure relates to a battery rack having a fixing frame, and more particularly, to a battery rack with increased durability to prevent a rack case from being deformed or broken by external impacts during delivery.

The present application is the National Phase Application of PCT/KR2020/095096, filed on Jul. 27, 2020, and claims the benefit of Korean Patent Application No. 10-2019-0105127 filed on Aug. 27, 2019 and Korean Patent Application No. 10-2020-0090588 filed on Jul. 21, 2020 with the Korean Intellectual Property Office, the disclosures of which are incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery uses lithium-based oxide and a carbon material for a positive electrode active material and a negative electrode active material respectively. The lithium secondary battery includes an electrode assembly including a positive electrode plate and a negative electrode plate respectively coated with the positive electrode active material and the negative electrode active material with a separator interposed between, and a packaging or a battery pouch case to hermetically receive the electrode assembly together with an electrolyte solution.

Recently, secondary batteries are widely used not only in small devices such as portable electronic devices, but also in medium- and large-sized devices such as vehicles and energy storage systems. For use in medium- and large-sized device applications, many secondary batteries are electrically connected to increase the capacity and output. In particular, pouch-type secondary batteries are widely used in medium- and large-sized devices due to their advantage of being easy to stack.

More recently, with the growing need for large-capacity structures for use as a source of energy, there is an increasing demand for a battery rack including a plurality of secondary batteries electrically connected in series and/or in parallel, a battery module in which the secondary batteries are received and a battery management system (BMS).

The battery rack generally includes a rack case of metal to protect the battery modules from external impacts or receive and store them. Moreover, in recent years, with the growing demand for high capacity battery racks, there is an increasing trend towards battery racks including a plurality of battery modules having heavy loads.

However, the battery rack including the plurality of heavy battery modules has a very great weight. By this reason, during delivery of the battery rack including the plurality of battery modules received in the rack case, the rack case is deformed or broken by the loads of the heavy battery modules when the rack case vibrates or tilts.

To prevent the rack case from being deformed during delivery of the battery rack, the plurality of battery modules and the rack case are separately delivered. However, in this case, they occupy a higher volume, which increases the delivery cost, and it is necessary to assemble the rack case and the battery module in the installation location. As a consequence, the production cost of the battery rack increases.

DISCLOSURE

Technical Problem

The present disclosure is designed to solve the above-described problem, and therefore the present disclosure is directed to providing a battery rack with increased durability to prevent a rack case from being deformed or broken by external impacts during delivery.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery rack according to the present disclosure includes a plurality of battery modules arranged in a first direction, at least one rack case including a plurality of rack frames configured to mount the plurality of battery modules, and at least one fixing frame including a body in the shape of a plate extending along the plurality of battery modules and a fixing portion formed on one surface of the body and configured to be attached to each of the plurality of battery modules or detached from each of the plurality of battery modules.

Additionally, the battery module may include a plurality of hanger members respectively coupled to an outer surface of the plurality of battery modules, the fixing portion of the fixing frame may have a plurality of hook structures configured to be hook-coupled to the plurality of hanger members, and the plurality of hanger members may be configured to be coupled to a respective one of the plurality of hook structure of the fixing portion of the fixing frame.

Additionally, each of the plurality of battery module may include a module housing including an upper cover, a base plate, a front cover and a rear cover, and the each hanger member of the plurality of hanger members may be disposed on an outer side of the rear cover of a respective one of the plurality of module housings.

Additionally, each hanger member of the plurality of hanger members may include a hanger bar in the shape of a plate in which that the hook structure is inserted and fixed on one side, the hanger bar spaced a predetermined distance apart from the outer surface of the battery module, and a leg extending from each of two ends of the hanger bar, wherein each leg is fixed to the outer surface of the battery module, and each leg has a bent portion.

Additionally, the at least one fixing frame may include a support portion extending vertically along the body and extending from the body such that a surface wraps around at least part of an outer surface of each leg.

Additionally, the support portion may be configured to wrap around at least part of the outer surface of each leg of the hanger member even when the hook structure is separated from the hanger bar of the hanger member.

Additionally, upper and lower ends of the body of the at least one fixing frame may have a case coupling portion that is coupled to the rack case.

Additionally, the rack case may include a connecting bar connected to the case coupling portion to couple the case coupling portion to the rack case.

Additionally, the case coupling portion of the at least one fixing frame may include an upper bolting hole configured to couple the plurality of hook structures to the plurality of hanger members when coupled to the connecting bar, and a lower bolting hole spaced from the upper bolting hole at a predetermined distance in the vertical direction and configured to separate the plurality of structures from the plurality of hanger members when coupled to the connecting bar.

Additionally, the fixing frame may further include an indicator configured to indicate whether the plurality of hook structure structures is coupled to the plurality of hanger members.

Additionally, the fixing frame may further include a wall coupling portion configured to fix the fixing frame to a wall adjacent to the battery rack.

Additionally, the rack case may include a front frame including a plurality of pillars disposed at a front end of the plurality of battery modules and extending in a vertical direction and a connecting part connecting the pillars in a horizontal direction, a rear frame including a plurality of pillars disposed at a rear end of the plurality of battery modules and extending in the vertical direction and a connecting part connecting the pillars in the horizontal direction, and a top plate disposed on top of the plurality of battery modules.

Additionally, a lower end of each of the front frame and the rear frame may have a bent portion having one surface parallel to the ground, and a bolting hole formed in the bent portion.

Additionally, the battery rack may include two or more rack cases stacked in a vertical direction, each pillar of the front frame and the rear frame may have a bolting hole configured to be coupled to another rack case at an upper end, and a bolting hole may be disposed at the bent portion of the pillar the rack case disposed at an upper position may be bolt-coupled to a bolting hole of the pillar of the rack case disposed at a lower position.

Additionally, each pillar may include an outer pillar extending in a vertical direction and having one open horizontal side and an inner pillar inserted into the outer pillar and extending in the vertical direction.

Additionally, the outer pillar may be a C-shaped steel that is open to one side when viewed in a horizontal cross section, and the inner pillar may a rectangular pipe.

Additionally, the bent portion of the rear frame may have a slit into which a body of a bolt is slidably inserted in a horizontal direction.

To achieve the above-described object, an energy storage system according to the present disclosure includes at least one battery rack.

Advantageous Effects

According to an aspect of the present disclosure, the battery rack of the present disclosure includes at least one fixing frame including the fixing portion configured to be attached/detached to/from each of the plurality of battery modules, to prevent deformation of the rack case or failure or damage of the battery module or separation of the battery module from the battery rack due to the movement by the heavy battery module during delivery of the battery rack.

According to an aspect of an embodiment of the present disclosure, the present disclosure is configured such that the hanger member installed in each of the plurality of battery modules and the fixing portion of the fixing frame are hook-coupled to each other, it is possible to easily couple to each of the plurality of battery modules when the fixing frame hangs on the hanger member. When the delivery of the battery rack is completed and it is necessary to install in the installation location, it is possible to easily decouple the fixing frame from each of the plurality of battery modules, thereby performing the separation operation in a simple and quick manner.

According to an aspect of the present disclosure, the fixing frame of the present disclosure further includes the support portion extending from the body such that one surface wraps around at least part of the outer surface of the leg, to prevent the battery module from moving to the left and right during delivery. Accordingly, it is possible to prevent deformation of the rack case caused by the leftward and rightward movement of the battery module.

According to another aspect of the present disclosure, the wall coupling portion of the fixing frame is configured to fix the fixing frame to the wall adjacent to the battery rack, to couple and fix the upper part of the rack case to the wall of the storage location. Accordingly, it is possible to prevent the upper part of the battery rack from moving back and forth and to the left and right during delivery. Accordingly, it is possible to prevent deformation of the rack case of the battery rack, or deformation or damage of the plurality of battery modules by the rack case.

According to an aspect of the present disclosure, the pillar includes the outer pillar extending in the vertical direction and having one open horizontal side, and the inner pillar inserted into the outer pillar and extending in the vertical direction, thereby effectively increasing the mechanical strength of the rack case. That is, the combination of the inner pillar and the outer pillar, not a single pillar, may ensure a higher mechanical strength than the single configuration without increasing the weight of the rack case.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
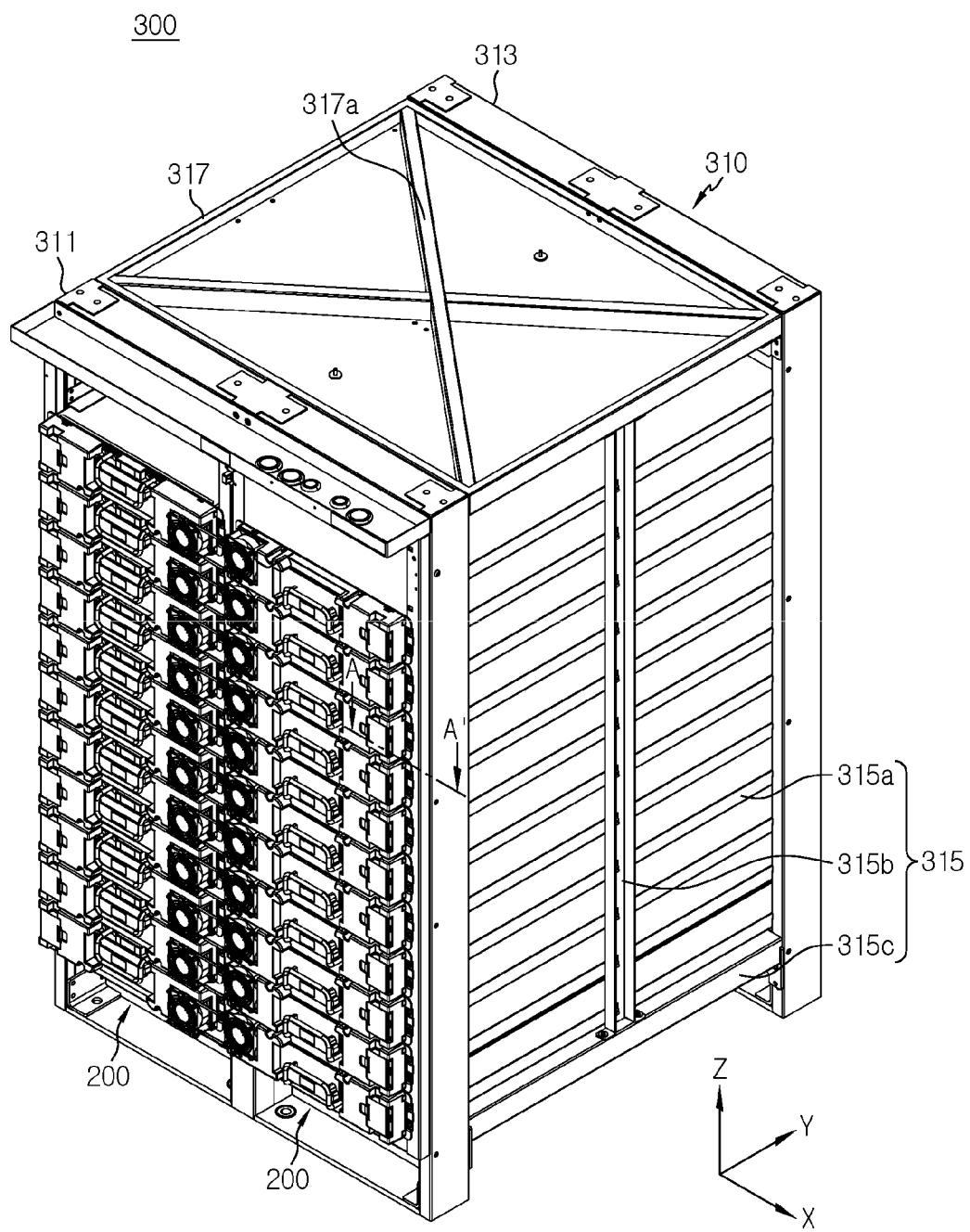
FIG. 1 is a schematic front perspective view of a battery rack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
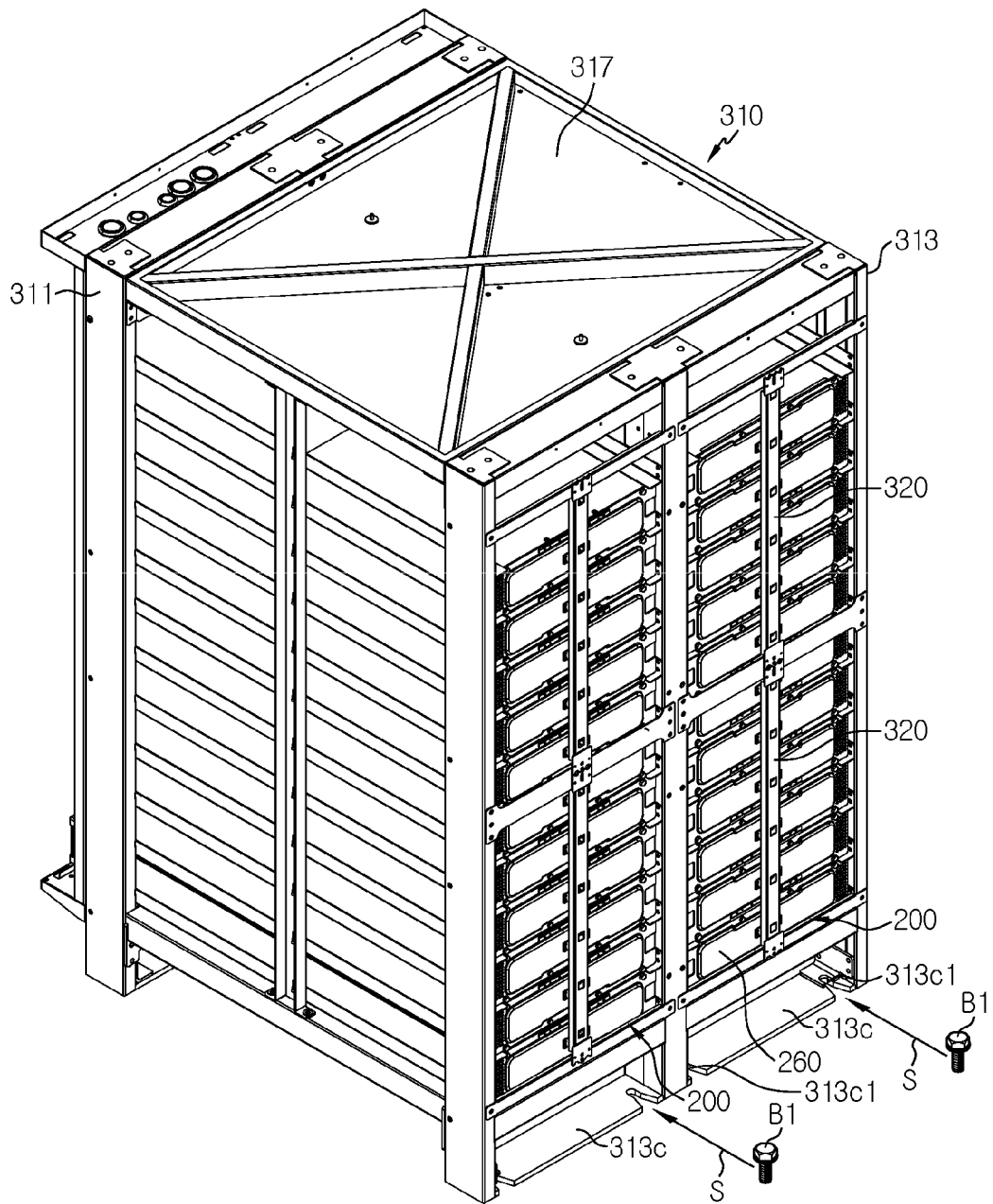
FIG. 2 is a schematic rear perspective view of a battery rack according to an embodiment of the present disclosure.
Figure 3:
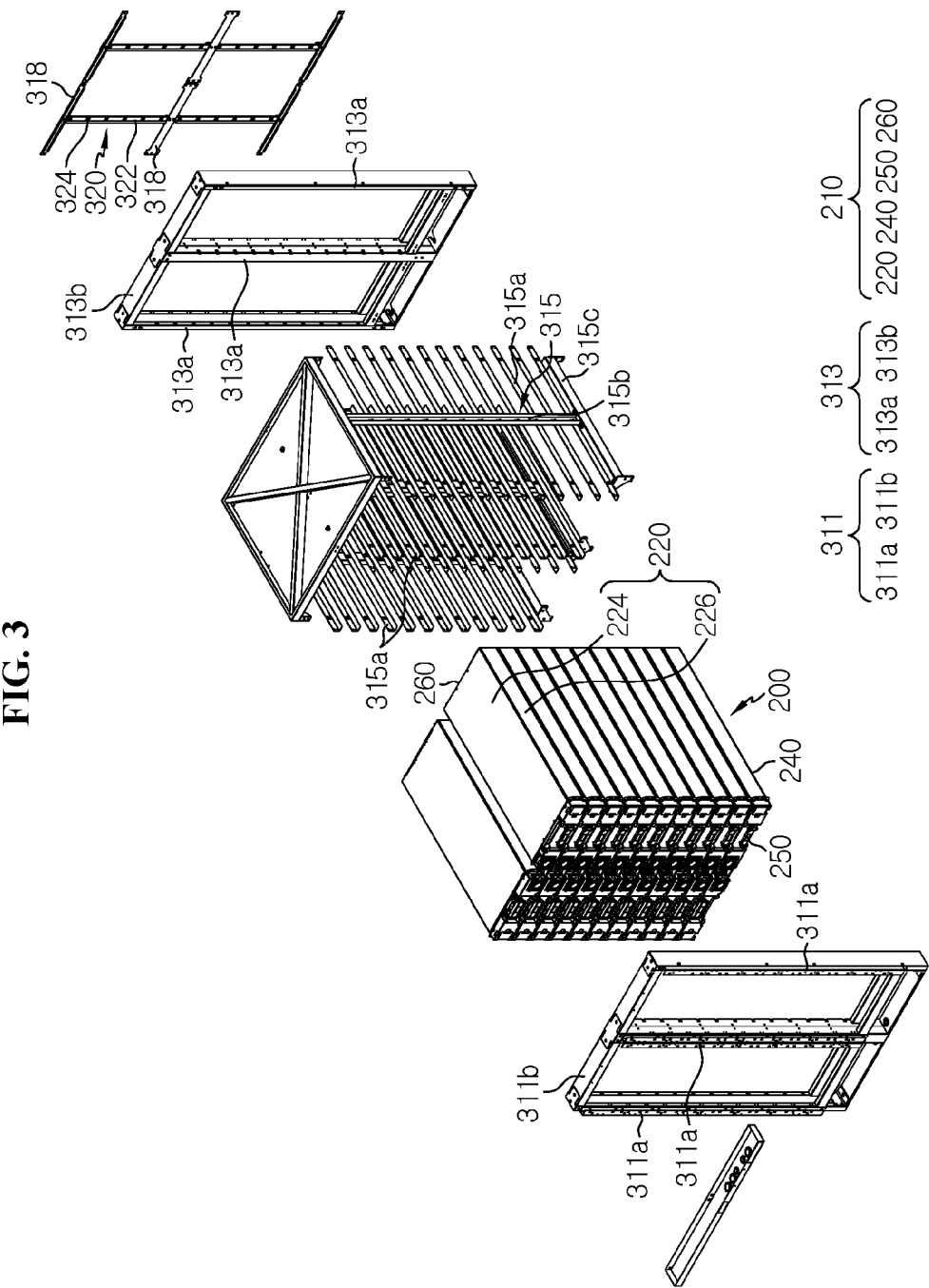
FIG. 3 is a schematic exploded perspective view of a battery rack according to an embodiment of the present disclosure.
Figure 4:
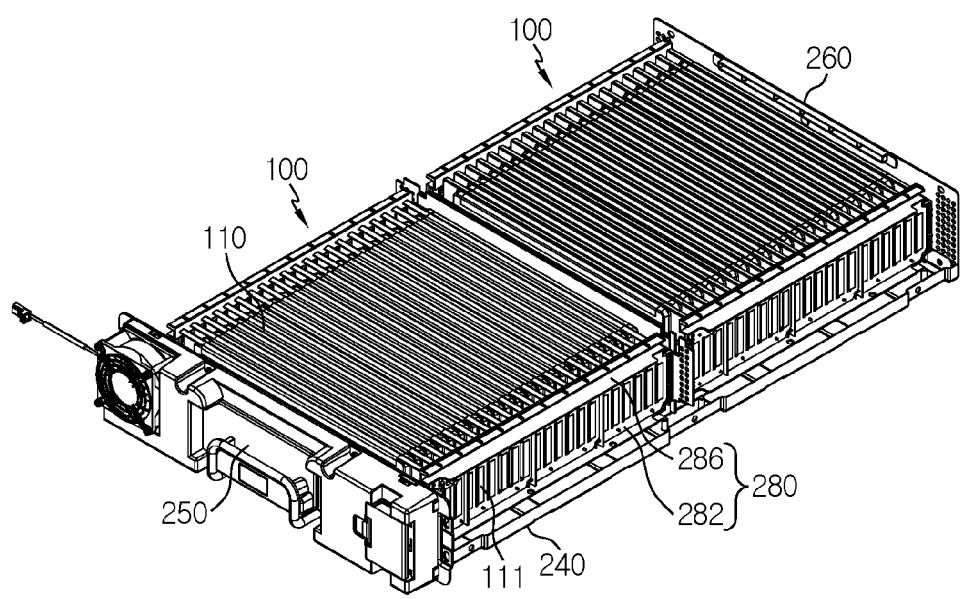
FIG. 4 is a schematic exploded perspective view of the inner part of a battery module of a battery rack according to an embodiment of the present disclosure.

FIG. 1 is a schematic front perspective view of a battery rack according to an embodiment of the present disclosure. FIG. 2 is a schematic rear perspective view of the battery rack according to an embodiment of the present disclosure. FIG. 3 is a schematic exploded perspective view of the battery rack according to an embodiment of the present disclosure. FIG. 4 is a schematic exploded perspective view of the inner part of a battery module of the battery rack according to an embodiment of the present disclosure.

Referring to FIGS. 1 to 4, the battery rack 300 according to an embodiment of the present disclosure includes a plurality of battery modules 200 arranged in a direction, at least one rack case 310 and at least one fixing frame 320.

Here, the plurality of battery modules 200 may be received within the rack case 310 in the vertical arrangement.

The plurality of battery modules 200 may include a module housing 210, and a cell assembly 100 having a plurality of secondary batteries 110 provided in the module housing 210 and stacked in a direction.

In detail, the secondary battery 110 may be a pouch-type secondary battery. For example, as shown in FIG. 4, each of 2 cell assemblies 100 may include 21 pouch-type secondary batteries 110 stacked side by side in the front-rear direction (y direction).

In particular, the pouch-type secondary battery 110 may include an electrode assembly (not shown), an electrolyte solution (not shown) and a pouch.

Each secondary battery 110 may stand in a direction (z direction) approximately perpendicular to the ground with two wide surfaces disposed in the front and rear directions and sealing portions disposed in the up, down, left and right directions.

Here, the pouch may have a concave receiving portion. The electrode assembly and the electrolyte solution may be received in the receiving portion. Each pouch may include an outer insulating layer, a metal layer and an inner insulating layer, and the inner adhesive layers adhere to each other at the edges of the pouch to form a sealing portion. A terrace portion may be formed at each end in the left-right direction (x direction) where a positive electrode lead 111 and a negative electrode lead (not shown) of the secondary battery 110 are formed.

The electrode assembly is an assembly of an electrode plate coated with an electrode active material and a separator, and includes at least one positive electrode plate and at least one negative electrode plate with a separator interposed between. The positive electrode plate of the electrode assembly may have a positive electrode tab, and at least one positive electrode tab may be connected to the positive electrode lead 111.

Here, the positive electrode lead 111 may have one end connected to the positive electrode tab and the other end exposed to the outside through the pouch, and the exposed portion may act as an electrode terminal of the secondary battery 110, for example, a positive electrode terminal of the secondary battery 110.

The negative electrode of the electrode assembly may have a negative electrode tab, and at least one negative electrode tab may be connected to the negative electrode lead. The negative electrode lead may have one end connected to the negative electrode tab and the other end exposed to the outside through the pouch, and the exposed portion may act as an electrode terminal of the secondary battery 110, for example, a negative electrode terminal of the secondary battery 110.

As shown in FIG. 4, the positive electrode lead 111 and the negative electrode lead may be formed at the left and right ends (x direction) with respect to the center of the secondary battery 110. That is, the positive electrode lead 111 may be provided at one end (right end) with respect to the center of the secondary battery 110. The negative electrode lead may be provided at the other end (left end) with respect to the center of the secondary battery 110.

For example, as shown in FIG. 4, each secondary battery 110 of the cell assembly 100 may be configured such that the positive electrode lead 111 and the negative electrode lead extend in the left-right direction.

According to this configuration of the present disclosure, it is possible to increase the area of the electrode lead without interference between the positive electrode lead 111 and the negative electrode lead of one secondary battery 110.

The positive electrode lead 111 and the negative electrode lead may be formed in the shape of a plate. In particular, the positive electrode lead 111 and the negative electrode lead may extend in the horizontal direction (X direction) with the wide surfaces standing upright in the front-rear direction.

Here, the horizontal direction refers to a direction parallel to the ground when the battery module 200 is placed on the ground, and may be referred to as at least one direction on a plane perpendicular to the vertical direction.

However, the battery module 200 according to the present disclosure is not limited to the above-described pouch-type secondary battery 110 and may include a variety of secondary batteries 110 known at the time of filing the patent application.

The at least two cell assemblies 100 may be arranged in the front-rear direction. For example, as shown in FIG. 4, 2 cell assemblies 100 may be arranged in the front-rear direction, and may be spaced a predetermined distance apart from each other.

The battery module 200 may further include a busbar assembly 280. In detail, the busbar assembly 280 may include at least one busbar 282 configured to electrically connect the plurality of secondary batteries 110 and at least two busbar frames 286 configured to mount the at least one busbar 282 on the outside. The at least two busbar frames 286 may be respectively provided on the left and right sides of the cell assembly 100.

In detail, the busbar 282 may include a conductive metal, for example, copper, aluminum and nickel.

The busbar frame 286 may include an electrical insulating material. For example, the busbar frame 286 may include a plastic material. In more detail, the plastic material may be polyvinyl chloride.

The module housing 210 may have an internal space to receive the cell assembly 100 therein. In detail, the module housing 210 may include an upper cover 220, a base plate 240, a front cover 250 and a rear cover 260.

In detail, the base plate 240 may have a larger area than the size of the lower surface of the at least two cell assemblies 100 to mount the at least two cell assemblies 100 thereon. The base plate 240 may be in the shape of a plate extending in the horizontal direction.

The upper cover 220 may include a top 224 and a side 226. The top 224 may be in the shape of a plate extending in the horizontal direction to cover the top of the cell assembly 100. The side 226 may be in the shape of a plate extending in the downward direction from the left and right ends of the top 224 to cover the left and right sides of the cell assembly 100.

The side 226 may be coupled to a portion of the base plate 240. For example, as shown in FIG. 3, the upper cover 220 may have the top 224 in the shape of a plate extending in the front-rear direction and the left-right direction. The upper cover 220 may have 2 sides 226 extending in the downward direction from each of the left and right ends of the top 224. The lower end of each of the 2 sides 226 may be configured to be coupled to the left and right ends of the base plate 240. In this instance, the coupling method may be a male-female coupling method or a welding coupling method.

The front cover 250 may be configured to cover the front side of the plurality of secondary batteries 110. For example, the front cover 250 may be in the shape of a plate having a larger size than the front surface of the plurality of secondary batteries 110. The plate shape may stand in the vertical direction.

Part of the outer periphery of the front cover 250 may be coupled to the base plate 240. For example, the lower part of the outer periphery of the front cover 250 may be coupled to the front end of the base plate 240. The upper part of the outer periphery of the front cover 250 may be coupled to the front end of the upper cover 220. Here, the coupling method may include bolt coupling.

The rear cover 260 may be configured to cover the rear side of the cell assembly 100. For example, the rear cover 260 may be in the shape of a plate having a larger size than the rear surface of the plurality of secondary batteries 110.

Part of the outer periphery of the rear cover 260 may be coupled to the base plate 240. For example, the lower part of the outer periphery of the rear cover 260 may be coupled to the front end of the base plate 240. The upper part of the outer periphery of the rear cover 260 may be coupled to the rear end of the upper cover 220. Here, the coupling method may include bolt coupling.

According to this configuration of the present disclosure, the module housing 210 is configured to stably protect the plurality of secondary batteries 110 from external impacts, to increase the safety of the battery module 200 against external impacts.

Referring back to FIGS. 1 and 2, the at least one rack case 310 may include a plurality of rack frames 315 configured to mount the plurality of battery modules 200, a front frame 311 disposed at the front end of the plurality of battery modules 200, and a rear frame 313 disposed at the rear end of the plurality of battery modules 200.

In detail, the rack frame 315 includes a receiving plate 315a. The receiving plate 315a may be in the shape of a plate that is bent about 90° in the shape of 'L'. The front and rear ends of the receiving plate 315a may be configured to be connected to the front frame 311 and the rear frame 313 respectively.

For example, as shown in FIG. 2, 2 receiving plates 315a may be provided to receive one battery module 200. The 2 receiving plates 315a may be configured to support the left and right lower ends of the battery module 200 in the upward direction. The 2 receiving plates 315a may act as a stopper to prevent the battery module 200 disposed at the lower position from moving up.

The 2 receiving plates 315a may be spaced apart in the horizontal direction as much as the horizontal width of the battery module 200. The 2 receiving plates 315a may be configured such that the front and rear ends are coupled to the front frame 311 and the rear frame 313.

When the plurality of receiving plates 315a is arranged in the vertical direction, the rack frame 315 may have a coupling bar 315b extending in the vertical direction to fix the plurality of receiving plates 315a. The coupling bar 315b may be configured to be coupled to part of each of the plurality of receiving plates 315a. The rack frame 315 may include a fixing bar 315c coupled to the upper and lower ends of the coupling bar 315b and having the front and rear ends coupled to the front frame 311 and the rear frame 313.

Referring back to FIGS. 1 to 3, the front frame 311 may include a plurality of pillars 311a extending in the vertical direction. The upper and lower ends of the pillar 311a may be coupled to an external object (for example, the bottom or floor, or other rack case 310). The pillar 311a may act as the main framework of the entire hexahedral shape of the rack case 310. For example, as shown in FIG. 1, the front frame 311 may include 3 pillars 311a disposed at the front end of the rack case 310.

The front frame 311 may include a connecting part 311b connecting the upper or lower end between the pillars 311a in the horizontal direction. The connecting part 311b may be configured to be connected (coupled) to the upper end or the lower end of the pillar 311a. For example, as shown in FIG. 3, the connecting part 311b may be disposed between each of the upper and lower ends of 2 pillars 311a.

The rear frame 313 may include a plurality of pillars 313a extending in the vertical direction. The upper and lower ends of the pillar 313a may be coupled to an external object, for example, the bottom or floor, or other rack case 310. The pillar 313a may act as the main framework of the entire hexahedral shape of the rack case 310. For example, as shown in FIG. 3, the rear frame 313 may include 3 pillars 313a disposed at the rear end of the rack case 310.

The rear frame 313 may include a connecting part 313b to connect the pillar 313a in the horizontal direction. The connecting part 313b may be configured to be connected (coupled) to the upper end or the lower end of the pillar 313a. For example, as shown in FIG. 3, the connecting part 313b may be disposed between each of the upper and lower ends of 2 pillars 313a.

The top plate 317 may be disposed on the uppermost of the plurality of battery modules 200. The top plate 317 may be configured to be connected to the top of the front frame 311 and the top of the rear frame 313. The top plate 317 may include an X-shaped beam 317a to reinforce the mechanical strength of the top plate 317. When the top plate 317 is rectangular on the plane, the X-shaped beam 317a may be disposed in contact with the corners of the rectangle.

Referring back to FIGS. 1 to 3, the at least one fixing frame 320 may have a body 322 in the shape of a plate extending along the plurality of battery modules 200. For example, as shown in FIG. 2, the 4 fixing frames 320 may be provided on the rear surface of the rear frame 313 of the rack case 310.

The fixing frame 320 may include a fixing portion 324 formed on one surface of the body 322 and configured to be attached/detached to/from each of the plurality of battery modules 200. The number of fixing portions 324 corresponding to the plurality of battery modules 200 may be provided. The fixing portion 324 may be configured to be attached/detached to/from the rear cover 260 of the battery module 200.

That is, the fixing portion 324 may be configured to be installed when the battery rack 300 needs to be delivered. When the battery rack 300 is installed at the installation location after delivery, the fixing portion 324 may be configured to be separated from the plurality of battery modules 200 and the rack case 310.

According to this configuration of the present disclosure, the battery rack 300 of the present disclosure includes the at least one fixing frame 320 including the fixing portion 324 configured to be attached/detached to/from each of the plurality of battery modules 200, to prevent deformation of the rack case 310 or failure or damage of the battery module 200 or separation of the battery module 200 from the battery rack 300 due to the movement of the battery rack 300 by the heavy battery module 200 during delivery. Subsequently, when the battery rack 300 is fixed at the installation location, the fixing frame 320 may be separated from the rack case 310 to deliver the battery rack 300.

Figure 5:
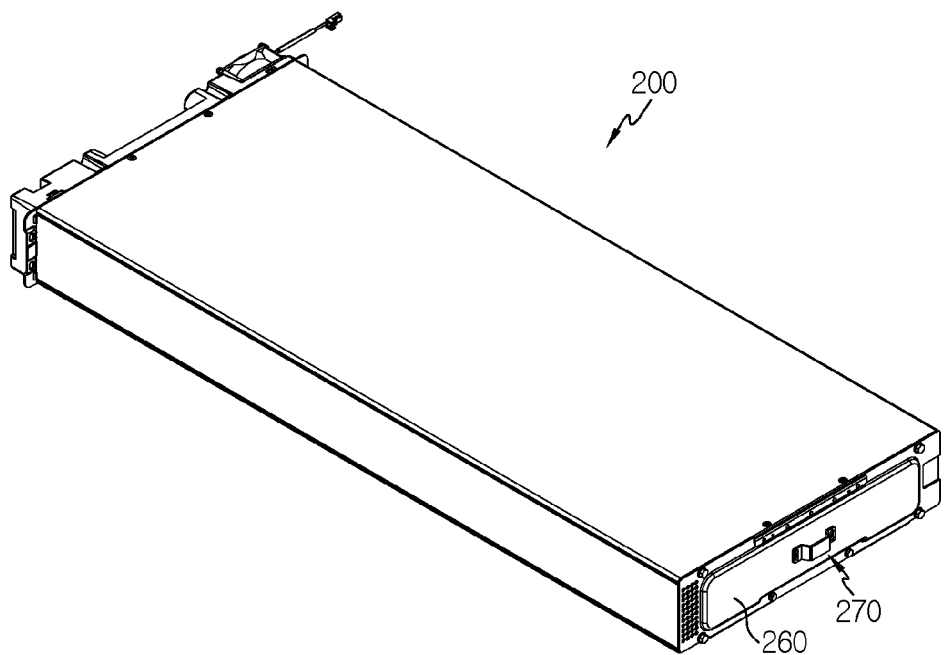
FIG. 5 is a schematic rear perspective view of a battery module of a battery rack according to an embodiment of the present disclosure.
Figure 6:
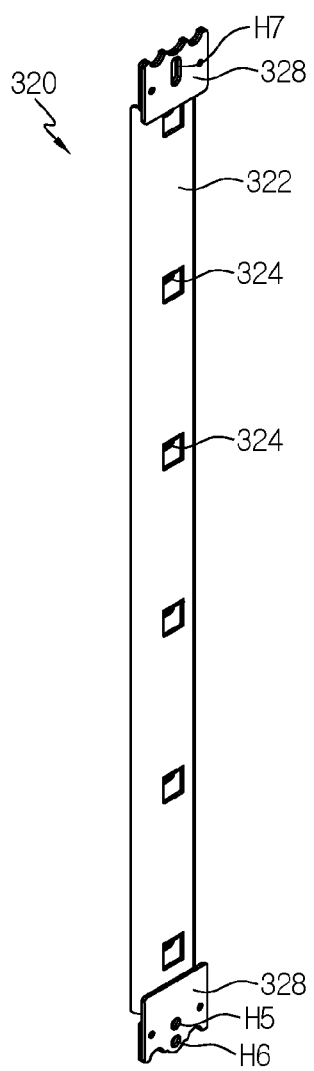
FIG. 6 is a schematic rear perspective view of a fixing frame of a battery rack according to an embodiment of the present disclosure.
Figure 7:
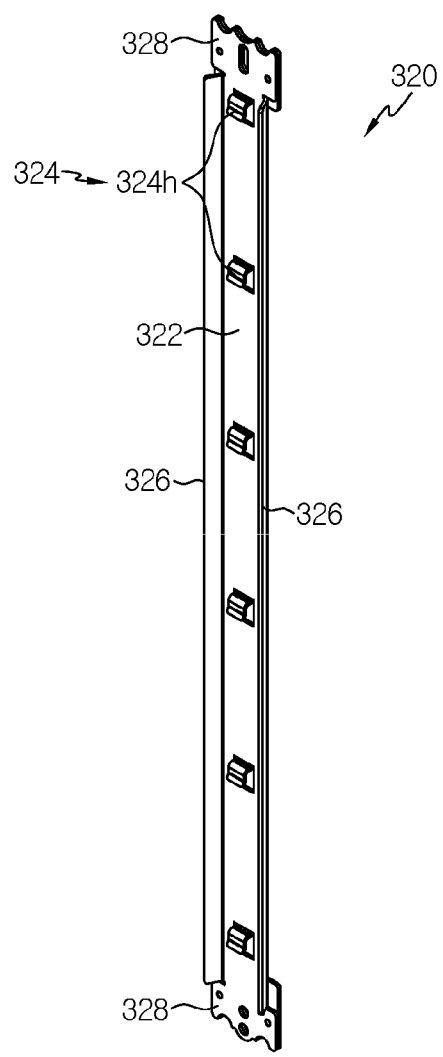
FIG. 7 is a schematic front perspective view of a fixing frame of a battery rack according to an embodiment of the present disclosure.

FIG. 5 is a schematic rear perspective view of the battery module of the battery rack according to an embodiment of the present disclosure. FIG. 6 is a schematic rear perspective view of the fixing frame of the battery rack according to an embodiment of the present disclosure. FIG. 7 is a schematic front perspective view of the fixing frame of the battery rack according to an embodiment of the present disclosure.

Referring to FIGS. 5 to 7, each of the plurality of battery modules 200 may include a hanger member 270 having a part of which is fixed to the outer surface. The hanger member 270 may be provided on the outer side of the rear cover 260 of the battery module 200. The part of the hanger member 270 may be firmly coupled to the rear cover 260. The hanger member 270 may be detached from the fixing portion 324. The hanger member 270 may be configured to be hook-coupled to the fixing portion 324 of the fixing frame 320.

As shown in FIG. 7, the fixing frame 320 may include 6 fixing portions 324. The fixing portion 324 may have a hook structure 324h configured to be hook-coupled to the hanger member 270.

According to this configuration of the present disclosure, the present disclosure is configured such that the hanger member 270 installed in each of the plurality of battery modules 200 and the fixing portion 324 of the fixing frame 320 are hook-coupled to each other, thereby making it easy to couple each of the plurality of battery modules 200 by hanging the fixing frame 320 on the hanger member. After the delivery of the battery rack 300 is completed, when the battery rack 300 is fixed to the installation location, it is possible to easily decouple the fixing frame 320 from each of the plurality of battery modules 200, thereby performing the operation of removing the fixing frame 320 in a simple and quick manner.

Figure 8:
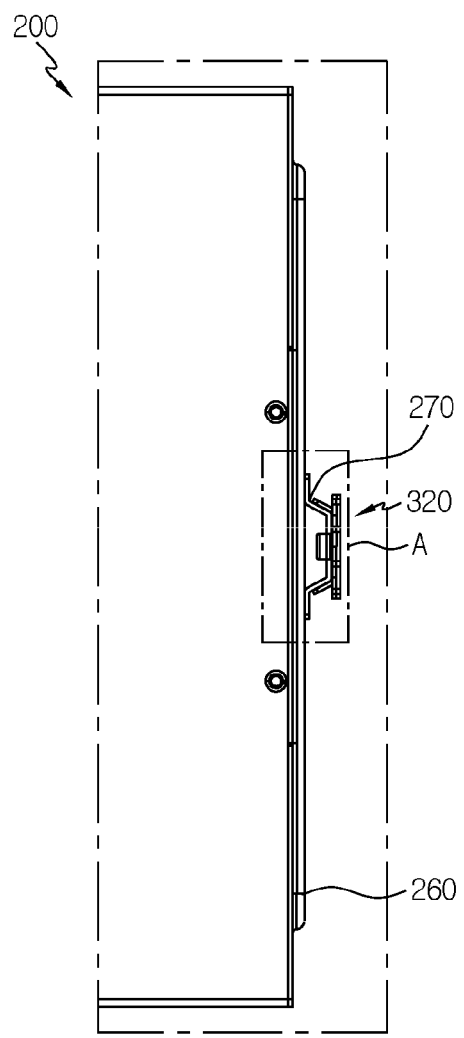
FIG. 8 is a schematic partial plane view of a battery module and a fixing frame according to an embodiment of the present disclosure.
Figure 9:
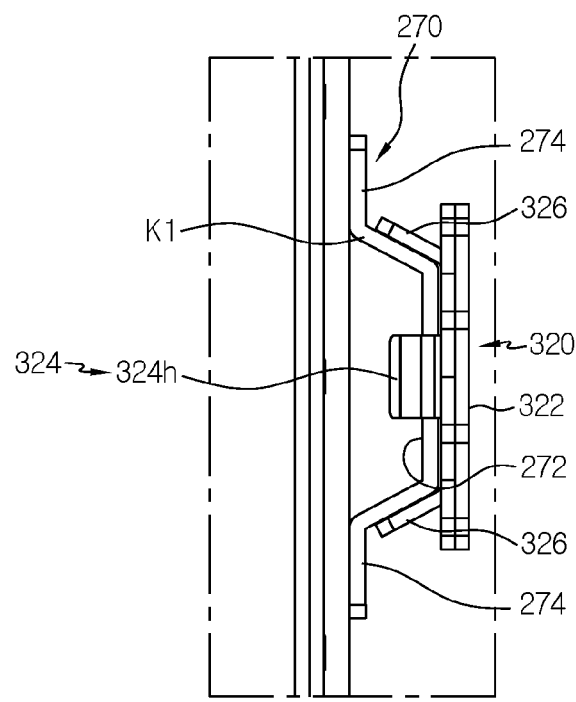
FIG. 9 is a schematic enlarged plane view of section A in FIG. 8.

FIG. 8 is a schematic partial plane view of the battery module and the fixing frame according to an embodiment of the present disclosure. FIG. 9 is a schematic enlarged plane view of section A in FIG. 8.

Referring to FIGS. 8 and 9 together with FIGS. 5 to 7, the hanger member 270 may include a hanger bar 272 and a leg 274. The hanger bar 272 may be in the shape of a flat plate in which the hook structure 324h is inserted and fixed on one side. The hanger bar 272 may be configured such that the flat plate stands upright in the vertical direction. The hanger bar 272 may be spaced a predetermined distance apart from the outer surface of the battery module 200.

The leg 274 may extend from each of the two ends of the hanger bar 272. The leg 274 may have a portion extending in the diagonal direction and a portion connected to the outer surface of the rear cover 260. The leg 274 may be weld-coupled or bolt-coupled to the outer surface of the battery module 200.

The leg 274 may have a bent part K1 that is bent in the diagonal direction such that the hanger bar 272 is spaced a predetermined distance apart from the outer surface of the battery module 200. That is, the leg 274 may have the bent part K1 that is bent in the rearward direction from two ends of the leg 274. The rearwardly bent part K1 may be configured to be connected to the hanger bar 272.

According to this configuration of the present disclosure, the hanger member 270 includes the hanger bar 272 spaced a predetermined distance apart from the outer surface of the battery module 200 and the leg 274 having the end extending from the hanger bar 272 fixed to the outer surface the battery module 200, and thus it is easy to couple or separate the hook structure 324h of the fixing portion 324 of the fixing frame 320 to/from the hanger member 270, thereby performing the installation operation in a simple and quick manner.

Referring back to FIGS. 8 and 9, the fixing frame 320 may further include a support portion 326 extending from the body 322 such that one surface wraps around at least part of the outer surface of the leg 274. The support portion 326 may be disposed on the left and right sides of the hook structure 324h. The support portion 326 may extend in the vertical direction along the body 322. The support portion 326 may extend diagonally in the left and right direction. Due to this structure, the support portion 326 may prevent the hanger member 270 from moving to the left and right. For example, after the battery rack 300 is installed, when an earthquake occurs, the support portion 326 may prevent the battery module 200 from moving to the left and right due to the earthquake.

According to this configuration of the present disclosure, the fixing frame 320 of the present disclosure further includes the support portion 326 extending from the body 322 such that one surface wraps around at least part of the outer surface of the leg 274, to prevent the battery module 200 from moving to the left and right during delivery. Accordingly, it is possible to prevent deformation of the rack case 310 caused by the leftward and rightward movement of the battery module 200.

Referring back to FIGS. 6 and 7 together with FIG. 2, the fixing frame 320 may include a case coupling portion 328. The case coupling portion 328 may be provided at the upper and lower ends of the body 322. The case coupling portion 328 may be coupled to the rack case 310.

In detail, the rack case 310 may include a connecting bar 318 coupled to the case coupling portion 328. The connecting bar 318 may have two ends coupled to the rear frame 313. For example, as shown in FIG. 3, the case coupling portion 328 provided at the upper and lower ends of the body 322 may be configured to be connected to 2 connecting bars 318 spaced apart from each other in the vertical direction. In this instance, the case coupling portion 328 may be bolting-coupled to the connecting bar 318. As shown in FIG. 3, a total of 6 connecting bars 318 coupled to the case coupling portion 328 of each of 4 fixing frames 320 may be provided each two connecting bars 318 for each of the upper, intermediate and lower ends of the rack case 310.

According to this configuration of the present disclosure, the case coupling portion 328 coupled to the rack case 310 is provided at the upper and lower ends of the body 322 of the fixing frame 320, and thus the fixing frame 320 and the rack case 310 may be fixed with a strong fixing strength, and the fixing frame 320 may strongly hold the plurality of battery modules 200. It is possible to effectively prevent deformation during delivery of the battery rack 300. It is possible to effectively increase the durability of the battery rack 300.

Figure 10:
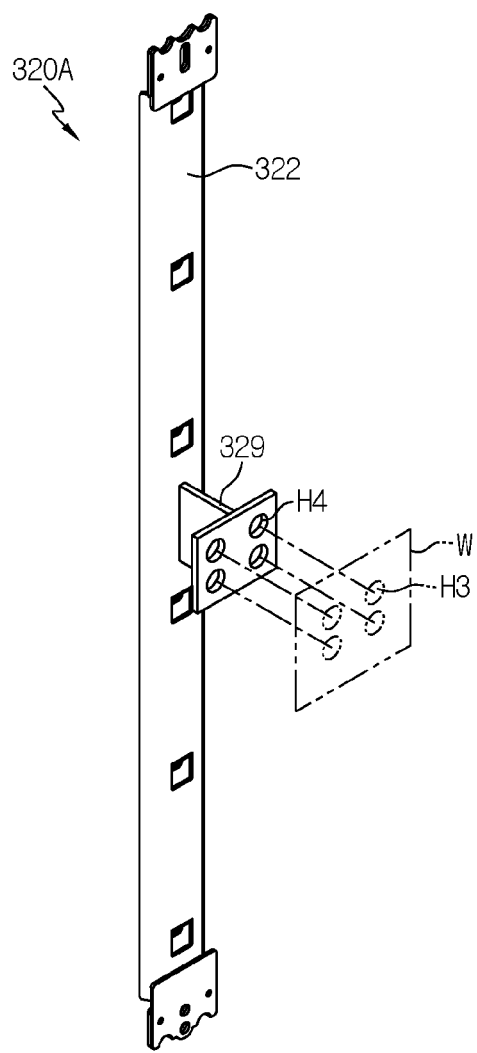
FIG. 10 is a schematic rear perspective view of a fixing frame according to another embodiment of the present disclosure.

FIG. 10 is a schematic rear perspective view of a fixing frame according to another embodiment of the present disclosure.

Referring to FIG. 10, the fixing frame 320A of FIG. 10 may have the same components as the fixing frame 320 of FIG. 6, except further comprising a wall coupling portion 329. A detailed description of the above-described components of the fixing frame 320A is omitted herein.

The wall coupling portion 329 of the fixing frame 320A may be configured to fix the fixing frame 320A to a wall W adjacent to the battery rack 300. The wall coupling portion 329 may have a coupling hole H4 for coupling with the wall W and a bolt (not shown) that is inserted into the coupling hole H4. The wall W may have a separate fixing element (not shown) for coupling with the wall coupling portion 329. The fixing element may have a fixing hole that is in communication with the coupling hole H4.

However, the wall coupling portion 329 is necessarily fixed to the wall W using only a fixing element, and the wall coupling portion 329 may be directly coupled to the wall W having a fixing hole H3. The wall coupling portion 329 may be fixed to the wall W through the bolt inserted into the coupling hole H4 of the wall coupling portion 329 and the fixing hole H3 of the wall W.

According to this configuration of the present disclosure, the wall coupling portion 329 of the fixing frame 320A is configured to fix the fixing frame 320A to the wall W adjacent to the battery rack 300, to couple and fix the upper part of the rack case 310 to the wall W of the storage location. It is possible to prevent the upper part of the battery rack 300 from moving back and forth and to the left and right during delivery. It is possible to prevent the rack case 310 of the battery rack 300 from being deformed, or the plurality of battery modules 200 from being deformed or damaged by the rack case 310.

Figure 11:
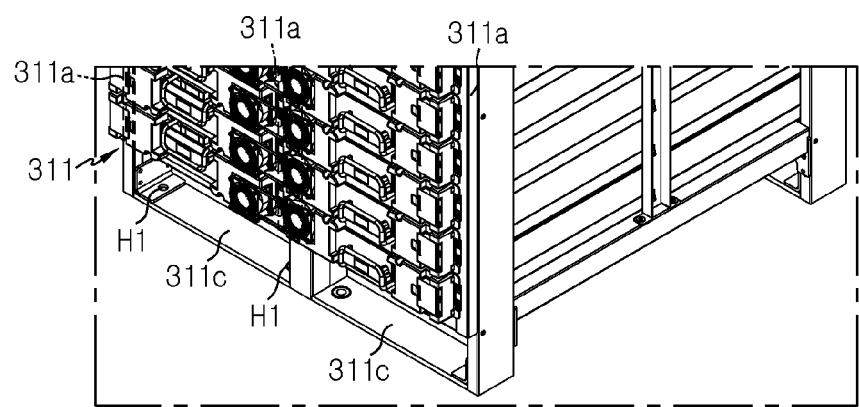
FIG. 11 is a schematic partial perspective view of a lower part of a battery rack according to an embodiment of the present disclosure.

FIG. 11 is a schematic partial perspective view of the lower part of the battery rack according to an embodiment of the present disclosure.

Referring to FIG. 11 together with FIG. 3, the front frame 311 and the rear frame 313 may have bent portions 311c, 313c having one surface parallel to the ground at the lower end respectively. The bent portion 311c may have a bent shape to be joined to the bottom where the battery rack 300 is stored.

For example, the bent portion 311c of the front frame 311 may not be separated from the pillar 311a, and may be integrally formed with the pillar 311a. That is, one surface of the lower end of the pillar 311a may be bent in contact with the bottom to form the bent portion 311c.

The bent portion 313c of the rear frame 313 may not be separated from the pillar 313a, and may be integrally formed with the pillar 313a. That is, one surface of the lower end of the pillar 313a may be bent in contact with the bottom to form the bent portion 313c.

The bent portion 311c of the front frame 311 may have a bolting hole H1. The bolting hole H1 is configured to be coupled to the bottom where the battery rack 300 is stored, and a fixing bolt (not shown) may be inserted into the bolting hole H1 for coupling with the bottom. Alternatively, the bolting hole H1 may be configured for coupling with another rack case 310.

The bent portion 313c of the rear frame 313 may have a slit 313c1 into which the body of a bolt B1 is slidably inserted in the horizontal direction S. That is, since the rear frame 313 may be disposed in contact with or close to the wall of the installation space of the battery rack 300 or another battery rack, an operator cannot have the operational space for performing the bolting operation at the rear of the rear frame 313 to fix the battery rack 300 to the bottom.

The inventor pre-installed the bolt B1 in the bottom to a predetermined depth such that the bolt B1 stands upright vertically from the ground, and slidably moved back the battery rack 300 to insert the body of the bolt B1 into the slit 313c1. Subsequently, the operator may tighten the bolt B1 inserted into the slit 313c1 using a long rod-shaped spanner in front of the battery rack 300 to fix the rear frame 313 to the bottom.

According to this configuration of the present disclosure, the front frame 311 and the rear frame 313 include the bent portions 311c, 313c having one surface parallel to the ground at the lower end thereof and the bolting hole H1 and the slit 313c1 formed in the bent portions 311c, 313c respectively, to fix the battery rack 300 to the bottom of the storage location with a strong fixing force, thereby effectively preventing the battery rack 300 from tilting or moving during delivery. It is easy to fix the battery rack 300 to the installation location.

Figure 12:
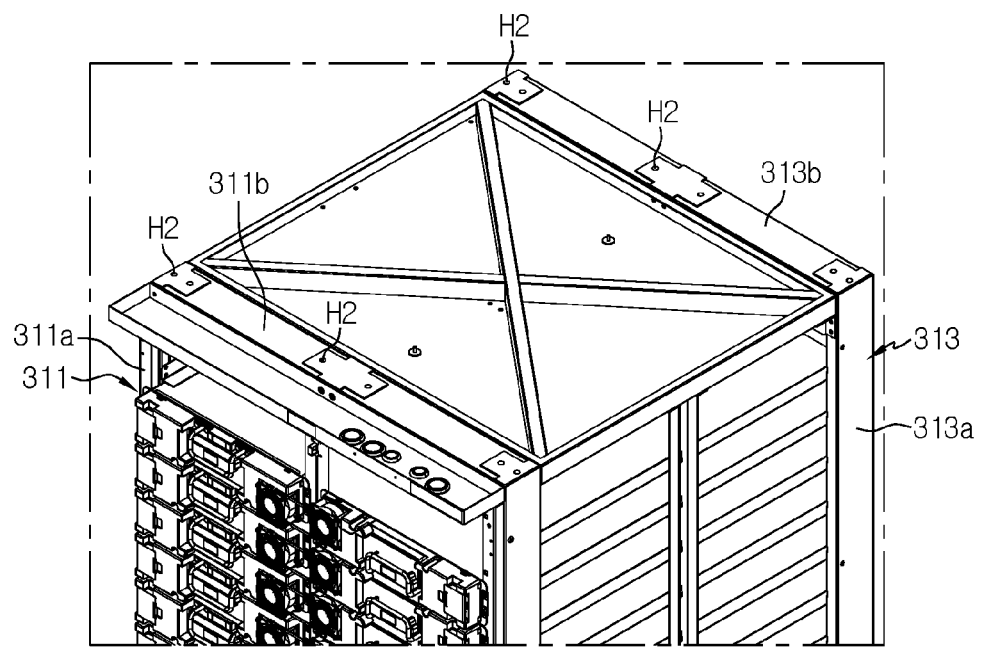
FIG. 12 is a schematic partial perspective view of an upper part of a battery rack according to an embodiment of the present disclosure.
Figure 13:
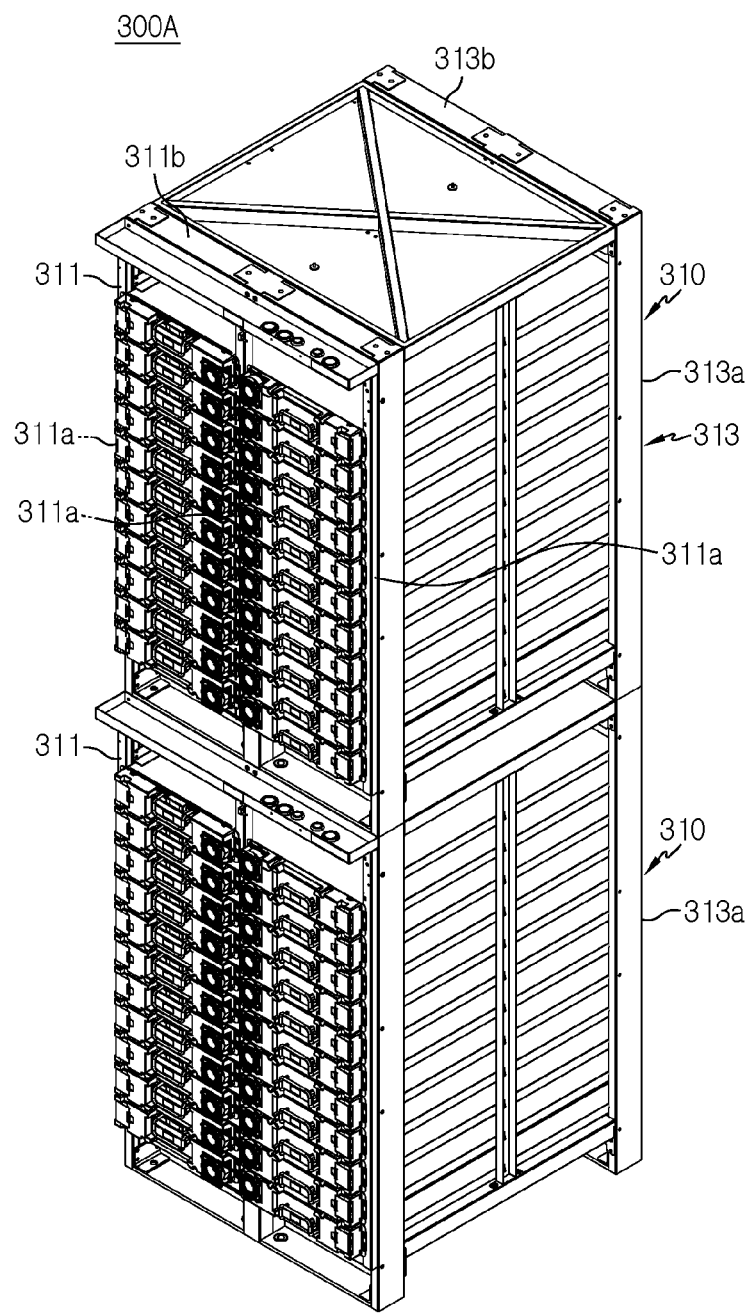
FIG. 13 is a schematic partial perspective view of a battery rack according to another embodiment of the present disclosure.

FIG. 12 is a schematic partial perspective view of the upper part of the battery rack according to an embodiment of the present disclosure. FIG. 13 is a schematic partial perspective view of a battery rack according to another embodiment of the present disclosure.

Referring to FIGS. 12 and 13 together with FIG. 3, the battery rack 300 may include two or more rack cases 310 stacked in the vertical direction. In detail, among the two or more rack cases 310, the lower part of the pillars 311a, 313a of the rack case 310 disposed at the upper position and the upper end of each of the pillars 311a, 313a of the rack case 310 disposed at the lower position may be coupled to each other.

In further detail, a bolting hole H2 configured to be coupled to another rack case 310 may be provided in the upper end of the pillar 311a of each of the front frame 311 and the rear frame 313. That is, the bent portion 311c provided below the pillar 311a of the rack case 310 disposed at the upper position and the bent portion 311c provided on the pillar 311a of the rack case 310 disposed at the lower position may be coupled to each other by a bolt (not shown) passing through the bolting hole H2 and the bolting hole H1.

For example, as shown in FIGS. 11 and 12, the bolting hole H2 in communication with the bolting hole H1 of the bent portion 311c provided below the pillar 311a of the rack case 310 disposed at the upper position may be provided in the upper end of the pillar 311a of the rack case 310 disposed at the lower position. That is, the fixing bolt may be inserted into the bolting hole H1 of the bent portion 311c of the rack case 310 disposed at the upper position and the bolting hole H2 provided in the upper end of the pillar 311a of the rack case 310 disposed at the lower position.

Figure 14:
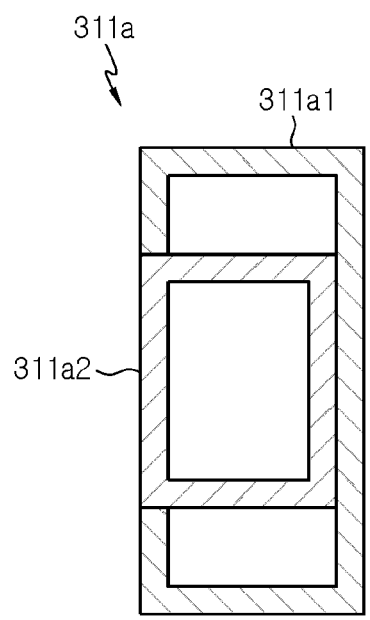
FIG. 14 is a schematic partial horizontal cross-sectional view of the battery rack of FIG. 1 taken along the line A-A'.

FIG. 14 is a schematic partial horizontal cross-sectional view of the battery rack of FIG. 1 taken along the line A-A'.

Referring to FIGS. 1 and 14, the pillars 311a, 313a of each of the front frame 311 and the rear frame 313 of the present disclosure may include an outer pillar 311a1 extending in the vertical direction and having one open horizontal side and an inner pillar 311a2 inserted into the outer pillar 311a1 and extending in the vertical direction.

In detail, the outer pillar 311a1 may be a C shaped steel that is open to one side when viewed in the horizontal cross section. The inner pillar 311a2 may be in the shape of a rectangular pipe. The outer pillar 311a1 and the inner pillar 311a2 may include different materials. The inner pillar 311a2 may be disposed in the outer pillar 311a1 to support the outer pillar 311a1 against the horizontal outer side.

According to this configuration of the present disclosure, the pillar 311a includes the outer pillar 311a1 extending in the vertical direction and having one open horizontal side and the inner pillar 311a2 inserted into the outer pillar 311a1 and extending in the vertical direction, thereby effectively increasing the mechanical strength of the rack case 310. That is, instead of the single pillar, the combination of the outer pillar 311a1 and the inner pillar 311a2 may ensure a higher mechanical strength than the single body configuration without greatly increasing the weight of the rack case 310.

Figure 15:
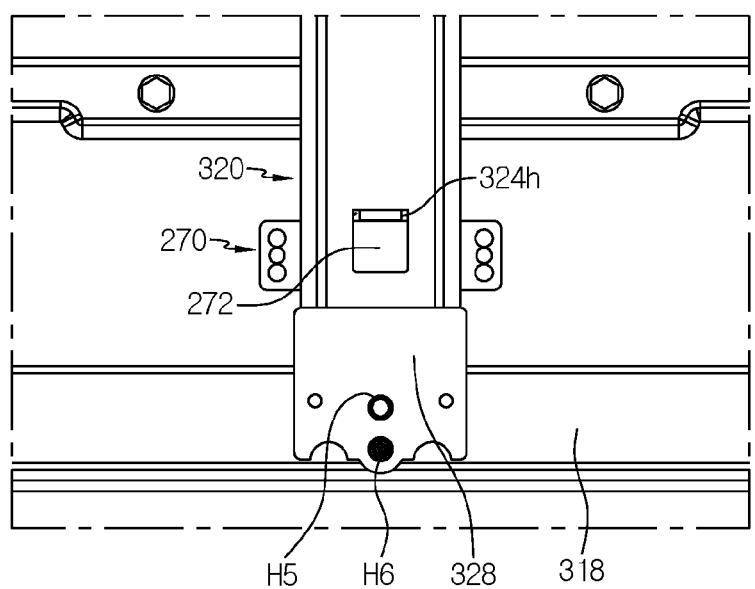
FIGS. 15 and 16 are schematic rear views of a fixing frame of a battery rack according to another embodiment of the present disclosure.
Figure 16:
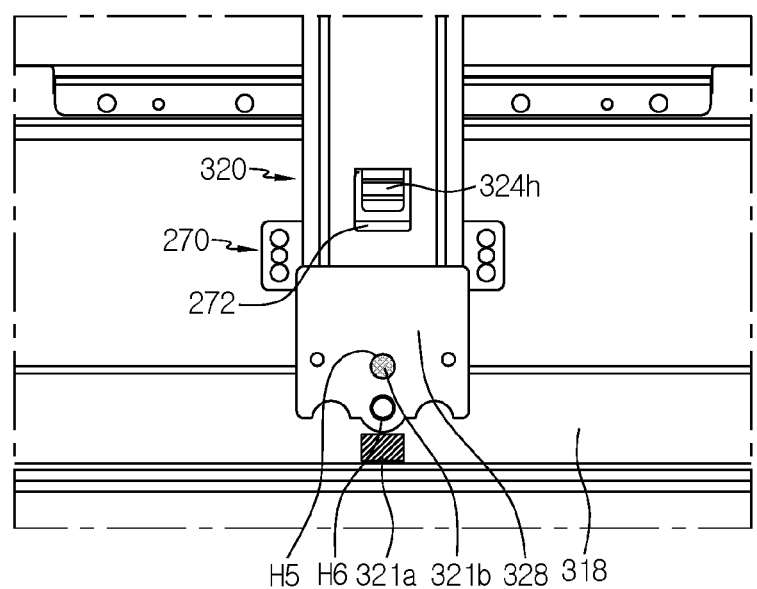

FIGS. 15 and 16 are schematic rear views of the fixing frame of the battery rack according to another embodiment of the present disclosure.

Referring to FIGS. 15 and 16 together with FIGS. 2 and 7, the case coupling portion 328 disposed below the fixing frame 320 may have 2 bolting holes H5, H6. The 2 bolting holes H5, H6 may be spaced a predetermined distance apart from each other in the vertical direction. For example, as shown in FIG. 15, when the case coupling portion 328 is bolting-coupled to the connecting bar 318 through the upper bolting hole H5, the hook structure 324h of the fixing portion 324 may be hook-coupled to the hanger bar 272 of the hanger member 270 by the downward movement of the fixing frame 320.

On the contrary, for example, as shown in FIG. 16, when the case coupling portion 328 is bolting-coupled to the connecting bar 318 through the lower bolting hole H6, compared to the coupling of the upper bolting hole H5 as previously described, the fixing frame 320 may move up and be coupled to the connecting bar 318, and the hook structure 324h of the fixing portion 324 may be separated from the hanger bar 272 of the hanger member 270.

Referring to FIG. 6, the case coupling portion 328 disposed on the fixing frame 320 may have a bolting hole H7 extending in the vertical direction. In this instance, the extended length of the bolting hole H7 may be similar to or longer than the distance between the upper bolting hole H5 and the lower bolting hole H6.

That is, the upper bolting hole H5 or the lower bolting hole H6 of the fixing frame 320 may be coupled to the connecting bar 318, and accordingly the upper and lower positions of the bolt coupled to the bolting hole H7 of the case coupling portion 328 disposed on the fixing frame 320 may be changed.

In detail, when the case coupling portion 328 is bolting-coupled to the connecting bar 318 through the upper bolting hole H5, the bolt inserted into the bolting hole H7 may be disposed on the bolting hole H7. On the contrary, when the case coupling portion 328 is bolting-coupled to the connecting bar 318 through the lower bolting hole H6, the bolt inserted into the bolting hole H7 may be disposed lower than the bolting hole H7.

That is, the previous example describes an embodiment in which the fixing frame 320 is removed after the delivery of the battery rack 300. In contrast, in another embodiment of the present disclosure, the case coupling portion 328 may be bolting-coupled to the connecting bar 318 through the lower bolting hole H6 to fix the hook structure 324h of the fixing portion 324 separated from the hanger bar 272 of the hanger member 270 to the rack case 310 without removing the fixing frame 320.

After the battery rack 300 is installed in the installation location, when a defective or old battery module 200 needs replacement, the battery module 200 mounted in the rack frame 315 is moved forward and removed, and a new battery module 200 is moved back from the rack frame 315 and is mounted. In this instance, the fixing portion 324 may move the battery module 200 back and forth when the hook structure 324h is kept in separated state from the hanger bar 272 of the hanger member 270. Even when the hook structure 324h is separated from the hanger bar 272 of the hanger member 270, since the support portion 326 extending in the vertical direction from the body 322 wraps at least part of the outer surface of the leg 274 of the hanger member 270, the fixing frame 320 may keep preventing the battery module 200 from moving to the left and right.

Accordingly, even when the battery rack 300 is installed in a location at which earthquakes are likely to occur, the fixing frame 320 may prevent the mounted battery module 200 from moving to the left and right due to the earthquake. Accordingly, it is possible to greatly improve the earthquake-resistant stability of the battery rack 300.

According to this configuration of the present disclosure, the fixing frame 320 has the 2 bolting holes H5, H6 spaced apart from each other in the vertical direction in the case coupling portion 328, to ease the operation of replacing the battery module 200 provided in the battery rack 300, and prevent the battery module mounted in the rack case 310 from moving to the left and right, thereby effectively improving the earthquake resistance and durability of the battery rack 300.

Referring to FIGS. 15 and 16, the fixing frame 320 of the present disclosure may further include an indicator. The indicator may be configured to indicate whether or not the hook structure 324h of the fixing portion is coupled to the hanger bar 272 of the hanger member 270 in color. The indicator may have stickers 321a, 321b of different colors. For example, the indicator may have a red sticker 321a and a green sticker 321b.

For example, as shown in FIG. 16, the red sticker 321a and the green sticker 321b may be attached to the outer surface of the connecting bar 318. Accordingly, for the fixing frame 320 to be coupled to the hanger member 270 of the plurality of battery modules 200, when the fixing frame 320 is coupled to the connecting bar 318 using a bolt inserted into the upper bolting hole H5, part of the red sticker 321a may be exposed to the outside through the lower bolting hole H6.

As shown in FIG. 15, to decouple the fixing frame 320 and the hanger member 270 of the plurality of battery modules 200, when the fixing frame 320 is coupled to the connecting bar 318 by inserting a bolt into the lower bolting hole H6, part of the green sticker 321b may be exposed to the outside through the upper bolting hole H5.

According to this configuration of the present disclosure, the present disclosure includes the indicator to allow a user to easily see the coupling of the fixing frame 320 and the hanger member 270 with the eye, thereby managing the battery rack fast, and easing the operation of separating a failed battery module 200 among the plurality of battery modules 200 from the rack case 310.

Although not shown, the battery rack 300 according to the present disclosure may further include, for example, a Battery Management System (BMS) (not shown), inside or outside of the rack case 310.

A power storage system according to the present disclosure may include at least one battery rack 300 according to the present disclosure. In particular, the power storage system may include a plurality of battery racks 300 according to the present disclosure. The plurality of battery rack 300 may be electrically connected to each other. The power storage system according to the present disclosure may be implemented in various forms, for example, smart grid systems or electricity charging stations.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

| | |
|---|---|
| 300: Battery rack | 100: Cell assembly |
| 200: Battery module | 210: Module housing |
| 110: Secondary battery | 320: Fixing frame |
| 310: Rack case | 270: Hanger member |
| 322, 324: Body, Fixing portion | 324h: Hook structure |
| 272, 274: Hanger bar, Leg | 328: Case coupling portion |
| 326: Support portion | 311b, 313b: Connecting part |
| 329: Wall coupling portion | H1, H2: Bolting hole |
| 321, 321a, 321b: Indicator, Red sticker, Green sticker | 224, 226: Top, Side |
| 311, 313, 315, 317: Front frame, Rear frame, Rack frame, Top plate | 260: Rear cover |
| 311a, 313a: Pillar | |

-continued

| |
|---|
| 311c: Bent portion |
| 220: Upper cover |
| 240: Base plate |
| H5, H6: Upper bolting hole, Lower bolting hole |
| 250: Front cover |
| 311a1, 311a2: Outer pillar, Inner pillar |
| 321a, 321b: Stickers |

INDUSTRIAL APPLICABILITY

The present disclosure relates to a battery rack. In addition, the present disclosure can be used in the industry related to an energy storage system comprising the battery rack.

What is claimed is:

1. A battery rack comprising:
a plurality of battery modules arranged in a first direction;
at least one rack case including a plurality of rack frames configured to mount the plurality of battery modules, the at least one rack case having two side walls, a top and a bottom;
at least one fixing frame connected to the at least one rack case, the at least one fixing frame including a body in the shape of a plate extending along the plurality of battery modules; and
a fixing portion formed on one surface of the body and configured to be attached to each of the plurality of battery modules or detached from each of the plurality of battery modules;
a plurality of hanger members respectively coupled to an outer surface of the plurality of battery modules,
wherein the fixing portion of the fixing frame has a plurality of hook structures,
wherein each hanger member of the plurality of hanger members is configured to be coupled to a respective one of the plurality of hook structures of the fixing portion of the fixing frame, and
wherein each hanger member of the plurality of hanger members includes:
a hanger bar in the shape of a plate in which the hook structure is inserted and fixed on one side, the hanger bar spaced a predetermined distance from the outer surface of the battery module; and
a leg extending from each of two ends of the hanger bar,
wherein each leg is fixed to the outer surface of the battery module, and
wherein each leg has a bent portion.

2. The battery rack according to claim 1, wherein each of the plurality of battery modules includes a module housing including an upper cover, a base plate, a front cover and a rear cover, and
wherein each hanger member of the plurality of hanger members is disposed on an outer side of the rear cover of a respective one of the plurality of module housings.

3. The battery rack according to claim 1, wherein the at least one fixing frame includes a support portion extending vertically along the body and extending from the body such that a surface wraps around at least part of an outer surface of each leg.

4. The battery rack according to claim 3, wherein the support portion is configured to wrap around at least part of the outer surface of each leg of the hanger member even when the hook structure is separated from the hanger bar of the hanger member.

5. The battery rack according to claim 1, wherein upper and lower ends of the body of the at least one fixing frame have a case coupling portion that is coupled to the rack case.

6. The battery rack according to claim 5, wherein the rack case includes a connecting bar connected to the case coupling portion to couple the case coupling portion to the rack case.

7. The battery rack according to claim 6, wherein the case coupling portion of the at least one fixing frame includes:
   an upper bolting hole configured to couple the plurality of hook structures to the plurality of hanger members when coupled to the connecting bar; and
   a lower bolting hole spaced from the upper bolting hole at a predetermined distance in the vertical direction and configured to separate the plurality of hook structures from the plurality of hanger members when coupled to the connecting bar.

8. The battery rack according to claim 7, wherein the fixing frame further includes an indicator configured to indicate whether the plurality of hook structures is coupled to the plurality of hanger members.

9. The battery rack according to claim 1, wherein the fixing frame further includes a wall coupling portion configured to fix the fixing frame to a wall adjacent to the battery rack.

10. The battery rack according to claim 1, wherein the rack case includes:
    a front frame including a plurality of pillars disposed at a front end of the plurality of battery modules and extending in a vertical direction, and a connecting part connecting the pillars in a horizontal direction;
    a rear frame including a plurality of pillars disposed at a rear end of the plurality of battery modules and extending in the vertical direction and a connecting part connecting the pillars in the horizontal direction; and
    wherein a lower end of each of the front frame and the rear frame has a bent portion having one surface parallel to the ground, and a bolting hole formed in the bent portion.

11. The battery rack according to claim 10, wherein the battery rack includes two or more rack cases stacked in a vertical direction,
    wherein each pillar of the front frame and the rear frame has a bolting hole configured to be coupled to another rack case at an upper end,
    wherein a bolting hole is disposed at the bent portion of the pillar, and
    wherein the rack case disposed at an upper position is bolt-coupled to a bolting hole of the pillar of the rack case disposed at a lower position.

12. The battery rack according to claim 10, wherein each pillar includes an outer pillar extending in a vertical direction and having one open horizontal side and an inner pillar inserted into the outer pillar and extending in the vertical direction.

13. The battery rack according to claim 12, wherein the outer pillar is a C-shaped steel that is open to one side when viewed in a horizontal cross section, and the inner pillar is a rectangular pipe.

14. The battery rack according to claim 10, wherein the bent portion of the rear frame has a slit into which a body of a bolt is slidably inserted in a horizontal direction.

15. An energy storage system comprising at least one battery rack according to claim 1.

16. The battery rack according to claim 1, wherein the at least one fixing frame extends in the first direction.

17. The battery rack according to claim 1, wherein the at least one fixing frame is attached to a rear of the at least one rack case between side edges of the at least one rack case.

18. The battery rack according to claim 1, wherein the plurality of hook structures extend toward the plurality of battery modules.

* * * * *